United States Patent
Harper et al.

[11] 3,922,658
[45] Nov. 25, 1975

[54] FLUID LEVEL MONITOR

[75] Inventors: Patrick D. Harper, Seaford; Theodore L. Knight, Newport News; Michael Slavin, Gloucester Point; Ward A. Ingels, Newport News, all of Va.

[73] Assignee: The Bendix Corporation, Southfield, Mich.

[22] Filed: Dec. 4, 1974

[21] Appl. No.: 529,425

[52] U.S. Cl. ............ 340/244 R; 73/295; 338/23; 340/59
[51] Int. Cl.² .................................. G08B 21/00
[58] Field of Search .......... 340/59, 244; 338/22, 23; 328/4, 1; 323/69; 236/46, 94; 219/331; 137/392; 73/295

[56] References Cited
UNITED STATES PATENTS

| | | | |
|---|---|---|---|
| 2,926,299 | 2/1960 | Rogoff | 323/68 |
| 3,181,557 | 5/1965 | Lannan, Jr. | 340/244 R X |
| 3,307,398 | 3/1967 | Exon | 338/23 X |
| 3,335,606 | 8/1967 | Scarpa | 340/244 R X |
| 3,502,944 | 3/1970 | Squiers | 338/23 X |
| 3,505,632 | 4/1970 | Matsuzaki et al. | 338/23 |
| 3,568,125 | 3/1971 | Villemant et al. | 338/23 |

FOREIGN PATENTS OR APPLICATIONS

| | | | |
|---|---|---|---|
| 772,046 | 4/1957 | United Kingdom | 73/295 |

Primary Examiner—John W. Caldwell
Assistant Examiner—Daniel Myer
Attorney, Agent, or Firm—W. G. Christoforo; Bruce L. Lamb

[57] ABSTRACT

A means for monitoring the level of fluid in a container is comprised of a thick film heating device located, at least in part, in close proximity to a thick film thermistor device, both of which are disposed on a substrate. A detection device is included to detect circuit changes in response to heat flow into the thermistor device as would occur when fluid level varies.

15 Claims, 11 Drawing Figures

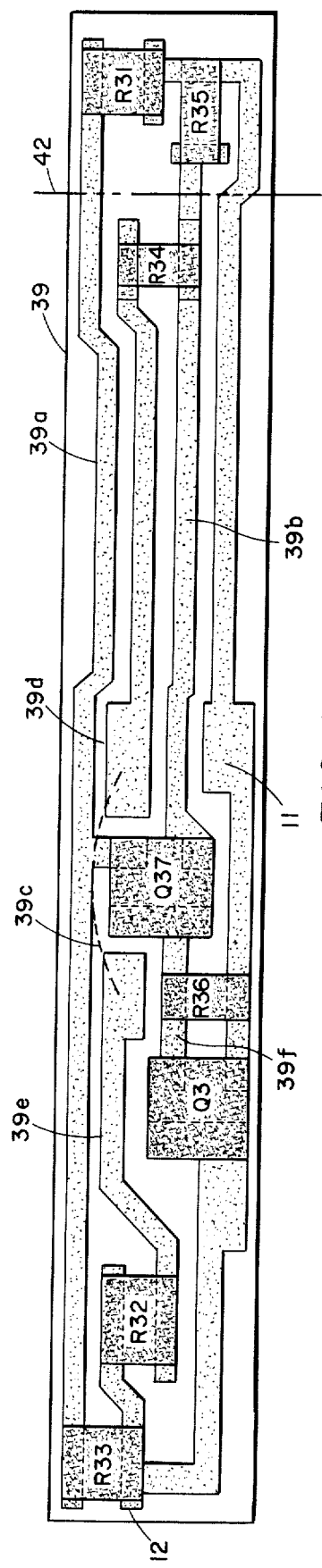
FIG. 5
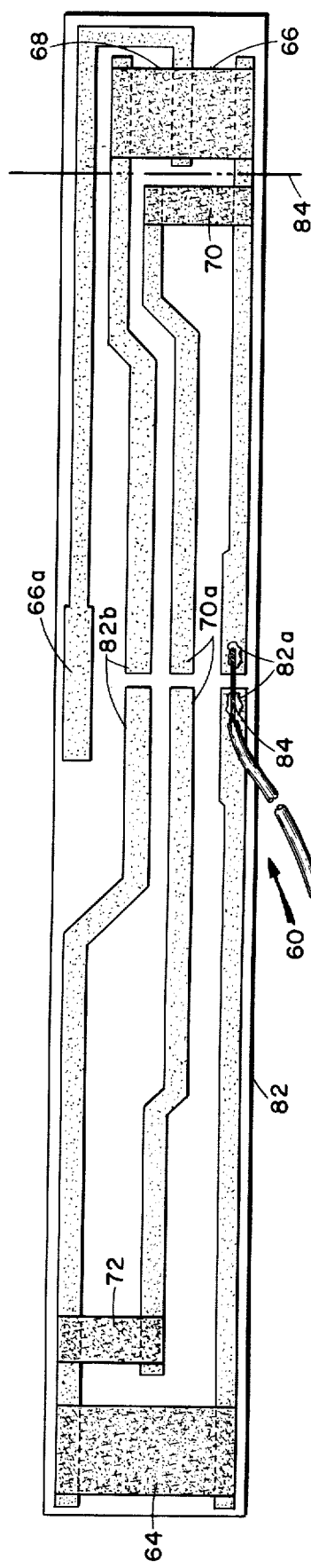
FIG. 8
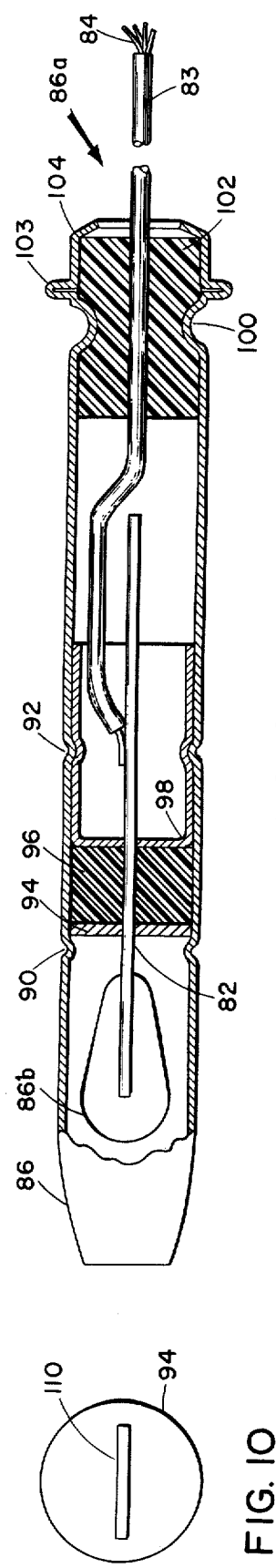
FIG. 9
FIG. 10

FLUID LEVEL MONITOR

BACKGROUND OF THE INVENTION

This invention relates to means for monitoring the level of fluids in a container or vessel and more particularly to such monitors which operate on electronic principles and are constructed from thick films. The invention is particularly adapted for use in widely varying temperature environments and where the voltage supply fluctuates over a relatively wide range. An example of such an environment is that found in the automotive field as the environment to which automotive vehicles are subjected during their regular operation.

It is important in the use of various apparatus and machinery and particularly in the use of automotive vehicles to sense and monitor the levels of fluids in containers and reservoir vessels. The fluids whose level is to be monitored might include, for example, cooling fluids such as radiator cooling fluids, lubricating fluids such as motor oil, working fluids such as transmission oils, etc. It is the practice, in order to determine whether the minimum safe level of a particular fluid is maintained, to monitor the fluid from time to time by physically gauging the fluid container by means such as a dip stick. This type of fluid level monitoring at best provides only intermittent observations and can result in undetected catastrophic or gradual fluid loss between observations. To improve on this method of gauging fluid level, various forms of automatic and relatively continuously indicating fluid level sensors have been proposed. Unfortunately, the types of fluid level sensors heretofore proposed have been found generally unsatisfactory and in particular have not worked well over the wide range of temperatures to which they are subjected and the wide range of voltage from which they must operate. For example, it is not unusual for the cooling fluid in an automotive vehicle to have a temperature range of 300° or for the voltage on which the sensor must operate to have a range from 10 to 18 V. d.c.

SUMMARY OF THE INVENTION

In order to overcome the aforementioned disadvantages in the prior art, thermistor means has been deposited or painted by thick film techniques on a substrate in close proximity to a heater means similarly deposited by thick film techniques on the substrate. Generally, these elements are arranged in a bridge circuit which is in a first condition, for example, a balacned condition as long as at least part of the thermistor and heater means are immersed in fluid whose level is to be monitored so that heat flow between the heater means and thermistor means is interrupted by the fluid. When the fluid level falls below the thermistor and heater means heat can then flow relatively unimpeded from the heater to the thermistor to thus place the circuit in a second condition.

In one embodiment of the invention, the thermistor means is comprised of at least two thermistors and two resistors arranged in a bridge circuit and a heater which is located external to the bridge circuit. Transverse points in the bridge circuit are sensed by a differential amplifier to provide a feedback for controlling current flow in the heater. In a second embodiment, the heater means is disposed in a bridge circuit with the thermistor means, the thermistor means comprising two thermistors, each of which is individually heated by a separate heater. In this circuit one heater is normally immersed in the fluid with its associated thermistor in close proximity but preferably above the fluid. The other thermistor is normally disposed with its heater further above the level of the fluid away from the heating influence of the other heater. When the fluid level drops below the level of the first heater, the bridge becomes unbalanced.

It is thus an object of this invention to provide a fluid level monitor which operates in accordance with electronic principles and which is constructed in accordance with thick film techniques.

Another object of this invention is to provide a fluid level monitor of the type described which is particularly adapted for use in automotive vehicles.

A further object of this invention is to provide a fluid level monitor which is relatively compact and economical of space.

Another object of this invention is to provide a fluid level monitor which can operate reliably over a wide range of temperature and which is energizable by a relatively wide range of voltage.

A further object of the invention is to provide a fluid level monitor of the type described which is packaged in a unitary and convenient form for easy attachment to the walls of a vessel or fluid reservoir and which further requires a minimum amount of electrical communication between itself and an external electrical system.

One more object of this invention is to provide a fluid level monitor which is capable of continuously monitoring the level of a fluid so as to signal an alarm when the fluid falls below a predetermined mark and wherein a plurality of such fluid level monitors can be used to sense the levels of fluids in a plurality of containers, the fluid level monitors being ganged together to a single alarm circuit.

These and other objects and advantages of the invention will be made clear by reading and understanding the following description together with the drawings and the appended claims.

BRIEF DESCRIPTION OF THE DRAWINGS

FIG. 5 illustrates how the elements of the schematic of FIG. 4 can be mounted on a substrate.

FIG. 8 illustrates how the probes of FIG. 7 can be constructed.

FIG. 9 shows another physical embodiment of the invention, in section.

FIG. 10 shows details of certain elements of the device of FIG. 9.

DESCRIPTION OF THE PREFERRED EMBODIMENT

Figure 1:
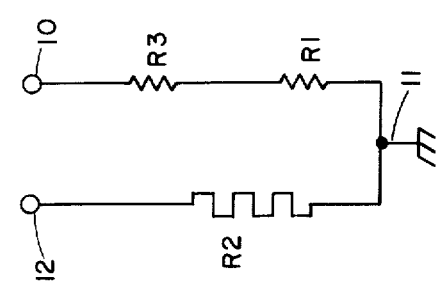
FIG. 1 is a simplified schematic which illustrates the principle of the invention.
Figure 2:
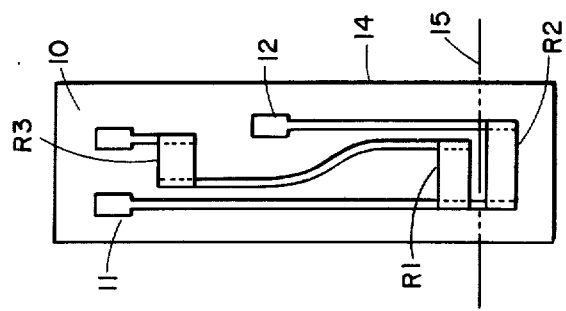
FIG. 2 illustrates how the elements of the invention can be mounted on a substrate.

Refer first to FIG. 1 where thermistors $R_1$ and $R_3$ are connected in series between terminals 10 and 11, the latter terminal being a common terminal such as ground. A heater $R_2$ is connected between terminals 12 and 11 and generally in close proximity to thermistor $R_1$ so that the heater influences that thermistor but is removed from thermistor $R_3$ so that the heater does not influence the latter thermistor. FIG. 2 illustrates how the elements $R_1$, $R_2$ and $R_3$ are positioned on substrate 14 in the form of thick films with conductive track 10 comprising terminal 10 and conductive track 12 comprising terminal 12 and conductive track 11 comprising terminal 11. Thermistor $R_1$ and heater $R_2$ are located at the lower extreme end of substrate 14 while thermistor $R_3$ is located at the upper end, removed from the heater. It is preferable that the thermistors have identical temperature characteristics. This is easily achieved by painting the thermistors on the substrate with the proper inks. In addition, the heaters and other resistors, if required, can also be painted on the substrate to produce a compact sensor. The principle of operation of the device of FIG. 2 is as follows. The long substrate 14 is normally immersed in the fluid whose level is to be monitored so that the fluid covers heater $R_2$. The normal fluid level is illustrated as line 15. In essence, the heater and thermistor are arranged in the reservoir or container so that at a first fluid level heat communication between the heater and thermistor of the heating efficiency of the thermistor by the heater is relatively poor. At a second fluid level which normally is a fluid level where the lower heater is completely out of the fluid the heat communication or efficiency is relatively good. A voltage is applied across terminals 12 and 11 to heater $R_2$ to cause the temperature of thermistor $R_1$ to be increased with respect to thermistor $R_3$ thus lowering the ratio $R_1/R_3$ to a predetermined level. By means not shown here but to be shown below the heater current is made to depend upon the rate of heat loss of heater $R_2$ into the fluid or, in other words, upon the rate of heat transfer from heater $R_2$ to thermistor $R_1$. While heater $R_2$ is in thermal contact with the fluid whose level is being monitored so that the heat transfer to thermistor $R_1$ is low, the current to heater $R_2$ will be relatively high. However, as the fluid level falls the heat loss will decrease. As a result, the current supplied to $R_2$ will also be decreased to maintain a temperature rise of thermistor $R_1$ to produce the desired constant ratio of $R_1/R_3$.

In FIG. 2 as well as the other illustrations of the fluid level monitor which include a substrate, the enlarged portions of the electrical track are provided to permit soldering wires or other elements thereto.

Figure 3:
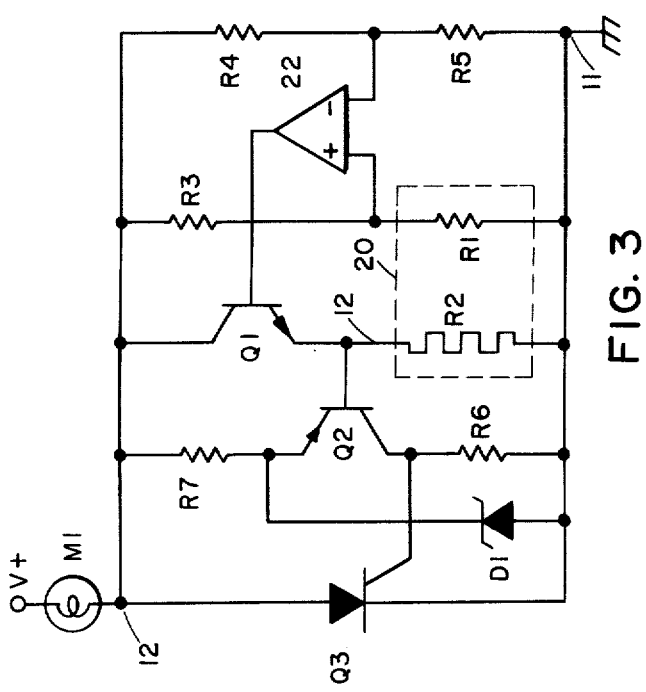
FIG. 3 is a schematic of one embodiment of the invention.

Refer now to FIG. 3 which shows a practical schematic of the device illustrated in FIGS. 1 and 2. In this figure, an indicator $M_1$ such as a light bulb, buzzer or other suitable device is connected between the positive voltage terminal V+ and the heater voltage terminal 12. A bridge circuit is connected between terminals 11 and 12, comprised of thermistors $R_1$ and $R_3$, previously seen in FIGS. 1 and 2, serially connected therebetween and parallel with the serial connection of resistors $R_4$ and $R_5$. The aforementioned heater $R_2$ is connected in series with the collector-emitter circuit of transistor $Q_1$ across terminals 11 and 12. Elements $R_1$ and $R_2$ are maintained in close proximity with one another as explained with respect to FIG. 2 and as illustrated by the dashed block 20. A differential amplifier 22 senses the voltage at the bridge transverse points, that is the points between thermistors $R_1$ and $R_3$ and resistors $R_4$ and $R_5$, respectively. Unbalance of the bridge causes the differential amplifier to apply an output signal at the base electrode of NPN transistor $Q_1$ to thus regulate current flow therethrough and through heater $R_2$. In this manner, the ratio of $R_1$ to $R_3$ is maintained equal to the ratio of $R_5$ to $R_4$.

Also connected across terminals 12 and 11 are resistor $R_6$, the collector emitter circuit of PNP transistor $Q_2$ and resistor $R_7$ arranged serially. A Zener diode $D_1$ is connected between the emitter of transistor $Q_2$ and terminal 11 to maintain the transistor emitter voltage constant.

A silicon contolled rectifier $Q_3$ is also connected between terminals 11 and 12 with its gate electrode connected to the collector electrode of transistor $Q_2$. The base electrode of transistor $Q_2$ is connected to the emitter electrode of transistor $Q_1$. The bridge circuit is normally designed to be balanced when thermistor $R_1$ is at as somewhat higher temperature than thermistor $R_3$. This higher temperature of thermistor $R_1$ results from heat generated by heater $R_2$. With heater $R_2$ or thermistor $R_1$ or both in thermal contact with the fluid whose level is being monitored, the heat transfer efficiency between heater $R_2$ and thermistor $R_1$ is low, requiring a relatively high heater current to maintain bridge balance. In this case, the voltage at the emitter-electrode of transistor $Q_1$ will be high so that transistor $Q_2$ is turned off. However, when both heater $R_2$ and thermistor $R_1$ are out of thermal contact with the fluid, the heat transfer efficiency improves so that the bridge and amplifier 22, acting through transistor $Q_1$, decreases heater current and the voltage at the emitter-electrode of transistor $Q_1$ accordingly drops. This permits transistor $Q_2$ to turn on, thus triggering silicon controlled rectifier $Q_3$.

Figure 4:
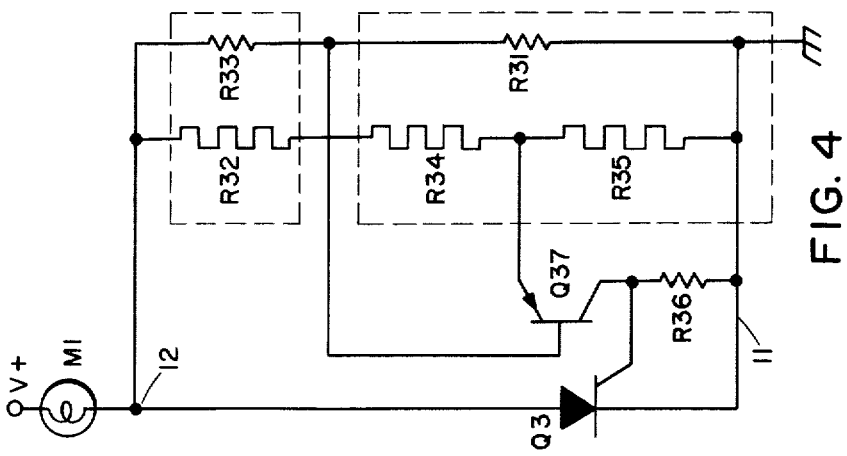
FIG. 4 is a schematic of another embodiment of the invention.

Refer now to FIG. 4 wherein like legends refer to like elements of FIG. 3 and in particular indicator $M_1$ is connected between the V+ voltage terminal and terminal 12 and silicon controlled rectifier is connected between terminal 12 and terminal 11. The bridge in this particular embodiment is comprised of thermistors $R_{31}$ and $R_{33}$ connected in series across terminals 12 and 11 and heaters $R_{32}$, $R_{34}$ and $R_{35}$ connected in series across the same terminals. Bridge points at the junction of heaters $R_{34}$ and $R_{35}$ and thermistors $R_{31}$ and $R_{33}$ are connected respectively to the emitter and base electrodes of PNP transistor 37 whose collector electrode is connected to the gate of silicon controlled rectifier $Q_3$ and also through resistor 36 to terminal 11. Heaters $R_{34}$ and $R_{35}$ are shown as two separate heaters to provide access to the bridge point between the two heaters and in actual practice in the physical embodiment of this circuit heaters $R_{34}$ and $R_{35}$ are painted on the substrate in close proximity to thermistor $R_{31}$ while heater $R_{32}$ is arranged in close proximity on the substrate with thermistor $R_{33}$. The arrangement of the elements on the substrate is much like that seen in FIG. 2 where elements $R_{31}$, $R_{34}$ and $R_{35}$ are located at the lower end of a long substrate and elements $R_{32}$ and $R_{33}$ are located at the upper end of the same substrate. The dotted boxes about each set of elements indicates the thermal interdependence of the thermistor with it associated heater portion.

The elements are arranged and the value of heaters $R_{32}$, $R_{34}$ and $R_{35}$ are suitably chosen so that the bridge is balanced or the voltage at the junction of the thermistors is higher than the voltage at the junction of heater elements $R_{34}$ and $R_{35}$ and transistor $Q_{37}$ is off when the end containing heaters $R_{34}$ and $R_{35}$ and thermistor $R_{31}$ are immersed in the fluid. In this condition, the efficiency of heat transfer into thermistor $R_{31}$ will be low. When the fluid drops below the level of heaters $R_{34}$ and $R_{35}$ and thermistor $R_{31}$, the heat transfer improves thus decreasing the voltage at the junction of thermistors $R_{31}$ and $R_{33}$. This permits transistor $Q_{37}$ to turn on, thus triggering silicon controlled rectifier $Q_3$, latching that element on to impress full supply voltage across indicator $M_1$.

Since temperature at a thermistor is very nearly linear with heater power, the differential temperature at a particular thermistor occasioned by a voltage change will be approximately equal to the differential temperature at the other thermistor caused by the same voltage change. The bridge balance will thus be relatively stable with voltage variations.

Since the bridge elements of the various circuits are made in accordance with thick film techniques, preferably by painting the elements on a substrate with the proper paints, it is relatively simple to make the temperature characteristics of like elements identical. In other words, the temperature characteristics of the thermistors on a particular substrate will be identical while the temperature characteristics of the other bridge elements will be identical to one another. Thus, temperature variations of the environment in which a particular monitor is operating will not affect its operating characteristics significantly.

With respect to the device of FIG. 3 it will be noted that the heat generated by heater $R_2$ is relatively constant at a low value and hence that device is particularly adapted for use with fluids which tend to deteriorate at higher temperatures. In the device of FIG. 4, however, the heat generated by the heaters varies in accordance with the applied voltage and hence that circuit is more suitable for fluids which are relatively temperature stable.

FIG. 5, reference to which should now be made, illustrates how the elements of the schematic of FIG. 4 can be mounted on a substrate 39. In this embodiment heaters $R_{34}$ and $R_{35}$ together with thermistor $R_{31}$ are arranged at the lower end of substrate 39 for immersion in the fluid whose level is to be monitored. The proper fluid level is illustrated by line 42. It should be understood that the actual operating fluid level is arbitrary, it being only necessary, as previously explained, that the circuit be in one state when the fluid level is acceptable and in a second state when the fluid level becomes unacceptable. Generally, the second state occurs when the fluid level drops below thermistor $R_{31}$. The various electrical tracks deposited or painted on the substrate comprise the various potential points of FIG. 4. Specifically, tracks 11 and 12 comprise the common and positive voltage terminals respectively while track 39a comprises the junction of thermistors $R_{31}$ and $R_{33}$ with the base electrode of $Q_{37}$. Track 39b comprises the junction of heaters $R_{34}$ and $R_{35}$ with the emitter-electrode of $Q_{37}$. A wire represented by dashed line 39c electrically connects tracks 39d and 39e which comprise the junction of heaters $R_{32}$ and $R_{34}$. Track 39f comprises the junction of the collector electrode of $Q_{37}$ with the gate electrode of $Q_3$ and $R_{36}$. As can be seen, resistor 36 is also deposited or painted on substrate 39.

$Q_3$ and $Q_{37}$ are standard packaged devices which are commercially available and which are adapted to be soldered directly to tracks on the substrate as shown.

Figure 6:
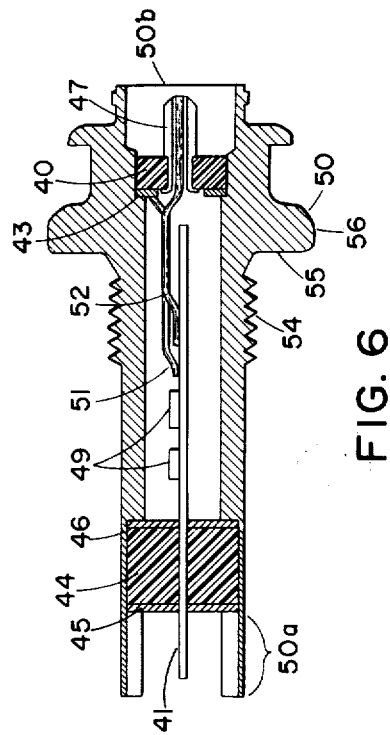
FIG. 6 shows a physical embodiment of the invention, in section.

The fluid level monitor can be packaged in a probe as illustrated in FIG. 6, reference to which figure should now be made. The monitor is suitably housed in an electrically conductive housing 50 having a threaded portion 54 adapted for mounting the monitor into a fluid container or reservoir and a shoulder 55 for correctly positioning the monitor against the aforementioned container or reservoir. An enlarged portion 56 is suitably finished in a hexagonal or other peripheral shape for engagement by wrenches or other tools for installation. The substrate 41 is arranged generally along the longitudinal axis of the monitor and has the heaters, tracks and thermistors painted thereon and the other electrical elements such as the transistors and silicon controlled rectifiers, represented by numeral 49, mounted thereon. End 50a is adapted for emersion in the fluid whose level is to be monitored, that end being generally open to allow access of the fluid against the thermistors and heaters painted at that end, with those elements and the substrate protruding therethrough and being supported by an insulating spacer 44. Spacer 44 is suitably positioned in an enlarged internal bore of the sensor by washers 45 and 46. It will also be noted that the splitting of body 50 at end 50a not only allows communication of the fluid with the end of the substrate, it also allows spacer 44 and washers 45 and 46 to be held within the bore of the monitor by deforming the body thereof.

Electrical connection to the substrate is made by two wires 51 and 52 soldered or otherwise suitably electrically fastened to the thick film substrate. Wire 51 is connected to terminal 11 at the substrate and at the other end is connected to a ground ring 43 which is clamped in electrical communication with body 50 by an insulating washer 40 which is held in position inside the body, suitably by staking. The other lead, lead 52, is electrically connected to a pin 47 which is suitably located and held in the center of insulating washer 40 and within cavity 50b for protection. Electrical communication to the monitor is made through pin 47 while electrical return is suitably through ground ring 43, body 50, and through the structure of the vehicle.

It has been found advantageous to coat the substrate and the elements painted thereon with an electrically insulating but heat conductive material to protect and insulate the various elements. A thin coating of low temperature fired glass has been found suitable for this purpose.

In each of the schematics shown above, the current drawn by the heaters and other bridge elements has been assumed to be too small to energize indicator $M_1$, thus permitting the indicator to be installed in the line from a voltage source so as to permit a single electrical connection to the monitor, with power return being through the monitor body and the reservoir or vehicle structure. In units actually built, this method of construction was entirely satisfactory. In particular, and as exemplary, in a unit built for automotive use in accordance with the schematic of FIG. 4 where the voltage supply varied from 10 to 18 VDC, the various circuit elements were:

$M_1$ Lamp 250 ma.
$R_{31}$ Thermistor 20K at 20°C
$R_{32}$ 30 Ohms
$R_{33}$ Thermistor 20K at 20°C
$R_{34}$ 70 Ohms
$R_{35}$ 100 Ohms
$R_{36}$ 1K Ohms If in a particular application the normal current, that is the current drawn before the silicon controlled rectifier is triggered, is so high that indicator $M_1$ would be normally energized, it is in that case necessary to remove the bridge supply from terminal 12 and supply the heater and other bridge elements directly from the power source. This, of course, will require two power leads to the monitor in addition to the power return through the monitor body, one lead being the connection between indicator $M_1$ and the anode of $Q_3$ and the other lead being the power lead to the bridge circuit.

If it is desired to control a single indicator from a number of different probes, it is necessary to package the elements somewhat differently. With respect to FIG. 3, the bridge elements, heater $R_2$, transistor $Q_1$ and differential amplifier 22 are best packaged in the probe. The other elements are suitably located exterior to the probe in proximity with indicator $M_1$. In the use of multiple probes the connection of a number of heaters $R_2$ in parallel between the base electrode of transistor $Q_2$ and ground may tend to cause that transistor to turn on prematurely. This can be prevented by providing a diode having its cathode connected to the emitter of transistor $Q_1$ packaged in each probe. The anodes of the diodes in the various probes are then connected together, by means exterior to the probe, to the base electrode of transistor $Q_2$. The direct connection between the base electrode of transistor $Q_2$ and the emitter electrode of transistor $Q_1$ is not used and is removed from the circuit. Thereafter, when heater current in a particular probe drops, indicating that the fluid level at the probe has dropped, the diode in the probe will become forward biased thus turning on transistor $Q_2$ to fire silicon rectifier $Q_3$ to energize indicator $M_1$. When using multiple probes with a single indicator it is necessary to provide, in addition to the power return, two further electrical connections to the probe: a power connection to the bridge and heater and a connection between the base electrode of transistor $Q_2$ and the anode of the probe diode. It is also advantageous in this case to supply the bridge and heater power directly from the power supply rather than through indicator $M_1$, as has been explained above.

The circuit of FIG. 4 can also be used in a multiple probe configuration suitably by packaging the bridge elements in the probe and the other elements externally. A diode can be inserted in the probe in the line from the base electrode of transistor 37 to prevent premature turn on of that transistor. For multiple probe use, in addition to the ground return, two leads are required for each probe: one bridge power and the other between the diode and the base electrode of transistor $Q_{37}$. It is also advantageous in this case to supply bridge power directly from the power source rather than through indicator $M_1$.

A further modification of the invention involves the use of a third thermistor, out of the influence of any heater, to parallel one of the bridge elements. In the circuit of FIG. 3 the third thermistor is suitably electrically connected across resistor $R_4$ while in the circuit of FIG. 4 the third thermistor is suitably electrically connected across heaters $R_{32}$ and $R_{34}$ (but removed from the influence of the heaters). This third thermistor is arranged to respond to the temperature of the probe environment and will tend to further make the circuit insensitive to changes of that temperature.

Figure 7:
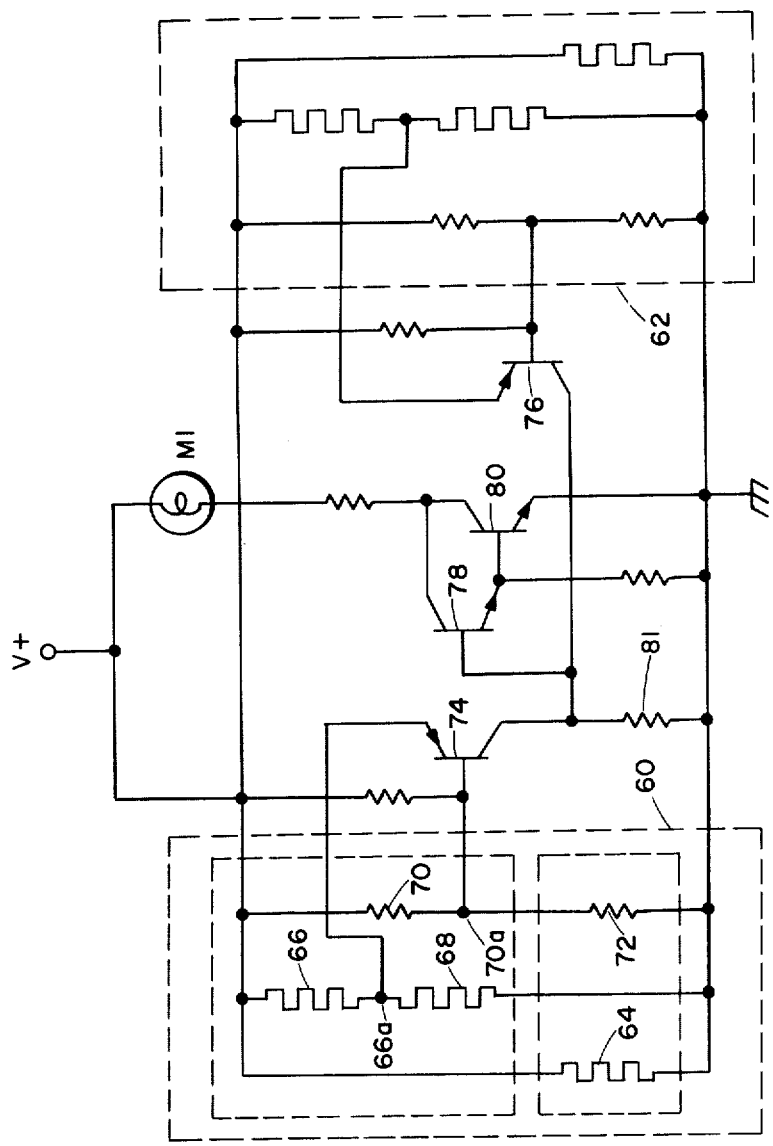
FIG. 7 is a schematic of non-latching multiple probes.

FIG. 7 shows the schematic of another embodiment of the invention having multiple probes, in this case probes having schematic diaphragms 60 and 62. In this embodiment the probes are identical to one another and hence only one, probe 60, need be described. Another feature of the device of FIG. 7 is that it is non-latching. That is, lamp or indicator $M_1$ is energized only while the fluid level is below a predetermined level. This prevents the indicator $M_1$ from being latched on if the fluid being monitored drops for a relatively short time to thus activate the indicator and then the fluid level returns to an acceptable condition. In this schematic, a heater 64 connected across the power supply cooperates with a thermistor 72 while heaters 66 and 68 connected in series across the power supply cooperate with thermistor 70. It will be noted that heater 64 electrically parallels heaters 66 and 68 whereas in the device of FIG. 4 all the heaters are arranged in series. The exact connection of the heaters is optional with the system designer.

In this embodiment, four connections are required to each probe, ground, V+ and the bridge points 66a and 70a. Of course, as previously explained, the ground connection could be made through the probe housing (not shown). Bridge points 66a and 70a are connected respectively to the emitter and base electrodes of PNP transistor 74, whose collector electrode is connected through resistor 81 to the power supply return, which here is ground. Transistor 74 is normally non-conductive. That is, its collector electrode is at ground potential when the bridge comprised of heaters 66 and 68 and thermistors 70 and 72 is balanced. This condition represents one state of fluid level, usually the acceptable level. However, when the bridge is unbalanced, indicating a low fluid level, transistor 74 becomes conductive to provide drive for transistors 78 and 80, which are connected in a Darlington couple configuration. This permits current to flow in indicator $M_1$. Of course, transistor 76, which is associated with probe 62, also will operate to turn on the Darlington couple if the level of the fluid to which probe 62 is exposed drops. It should now be obvious that additional probes can be connected into the circuit of FIG. 7.

Refer now to FIG. 8 which shows the elements of probe schematic 60 of FIG. 7 deposited or painted on substrate 82. Specifically, heaters 66 and 68 are shown in close proximity with thermistor 70 at the lower end of substrate 82, the end for immersion in the fluid to be monitored. The acceptable fluid level is indicated generally by line 84. Thermistor 72 and heater 64 are shown at the opposite end of the substrate. The tracks on the substrate comprise the various potential points of the schematic of FIG. 7 where tracks 70a and 66a comprise the like numbered bridge points, tracks 82a comprise the V+ voltage bus and tracks 82b comprise the voltage return or ground. Tracks 70a, 82a and 82b are shown optionally broken to isolate the various heaters and thermistors from one another during manufacture. This permits the resistance of the various elements to be measured directly. Before the circuit is put into use the various tracks will be electrically connected. This can be done by soldering the electrical wires communicating the probe with the circuit external to the probe so as to bridge gaps in the tracks. For example, tracks 82a are shown bridged by a wire 84.

Refer now to FIG. 9 which shows another probe including housing 86 suitable for insertion into a fluid containing vessel. For illustrative purposes it is assumed that the circuit and substrate of FIG. 8 are contained within housing 86. Substrate 82 is centrally located in cylindrical housing 86, which is suitably metallic. A bundle of electrical wires 83, including wire 84, is seen connected to substrate 82. The probe additionally comprises a stiff wahser 94, elastomer cylindrically shaped spacers 96 and 102, and cup shaped back-up washer 98. FIG. 10 shows a rectangular hole 110 in washer 94. Hole 110 is of such size as to permit substrate 82 to be fitted loosely therein. Washer 98 has a similar sized hole. Spacer 96 has a like shaped hole for supporting the substrate but of smaller size so that the substrate fits more snuggly therein.

Before assembling the substrate into the probe housing, the housing is provided with the annular rolled section 90 but without annular rolled sections 92 and 100. In addition, turned in flange 104 is initially straight and collinear with the sides of housing 86. This provides a straight, uninterrupted internal bore between end 86a and the shoulder formed by rolled section 90. An assembly comprised of substrate 82 and the circuit thereon, washers 94 and 98 and spacer 96 are inserted into the bore as shown. Washer 98 is then forced tightly against elastomer spacer 96 so that the spacer rectangular hole, previously described, securely grips the substrate. Rolled section 92 is then made with a suitable tool to lock washer 98 in place.

Elastomer spacer 102 has a hole therein adapted to contain the wire bundle 83. Spacer 102 is installed over the wire bundle and into place as shown and rolled section 100 made to thus lock spacer 102 in place and also to cause the spacer to securely grip the wire bundle. Flange 104 is turned in as shown to complete the assembly. In use, the probe can be snapped into a grommet installed in the top of a fluid containing vessel, the grommet snapping into rolled section 100 and against a stop provided by shoulder 103.

The end of the probe which is immersed in the fluid whose level is to be monitored is provided with housing openings, for example opening 86b, through which the fluid can circulate.

It should be obvious that the materials used must be relatively inert to the fluid whose level is to be monitored. In addition and in particular, spacer 96 and washers 94 and 98 must be electrically non-conductive to prevent the probe tracks from being shorted to one another. Alternately, a non-conductive material such as a glass film, previously described, can be used over the tracks for the same purpose. If the holes in washers 94 and 98 are large enough some of the elastomer material of spacer 96 will be extruded into these holes and aid in preventing any shorting of the substrate circuitry.

Figure 11:
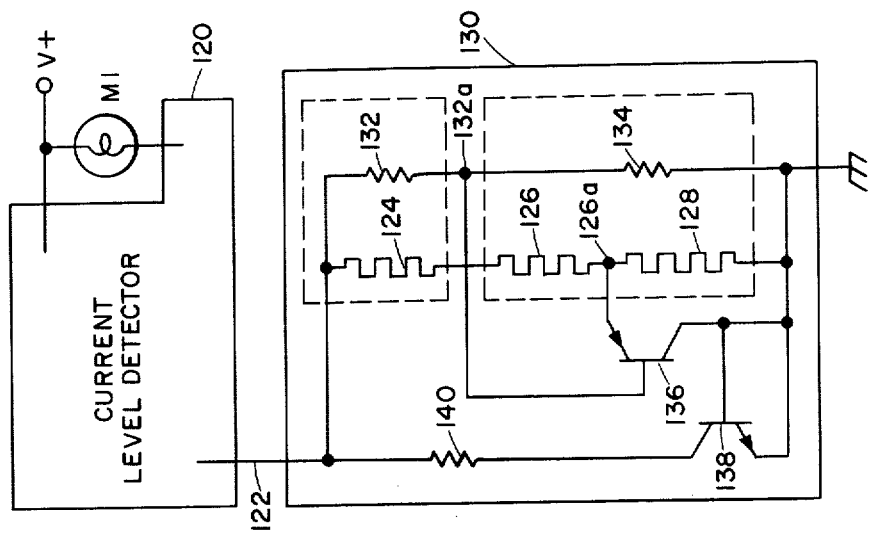
FIG. 11 is a schematic of an alternate form of a non-latching fluid level monitor.

The schematic of a non-latching fluid monitor which requires only a single lead into the probe in addition to a ground connection is seen in FIG. 11, reference to which should now be made. In this embodiment, the elements within box 130 comprise the probe schematic and are deposited or painted on a substrate in a manner which should now be obvious. Substrate power is provided via line 122 from a current level detector 120. A bridge circuit is comprised of heaters 124, 126 and 128 connected between line 122 and ground and thermistors 132 and 134 also connected in series between line 122 and ground. Heater 124 is associated with thermistor 132 and heaters 126 and 128 are associated with thermistor 134. Bridge points 126a and 132a are respectively connected to the emitter and base electrodes of PNP transistor 136. With the bridge balanced, transistor 136 is non-conductive so that no collector current flows. However, when the bridge becomes unbalanced, as will be the case when the fluid level falls, collector current flows thus turning on NPN transistor 138 so that current is drawn from current level detector 120 through resistors 140. Current level detector senses the increased current and in response thereto establishes a ground return for indicator $M_1$ thus providing an indication of low fluid level. When the fluid level is restored so that the bridge circuit again becomes balanced, transistor 138 will become non-conductive. Detector 120 senses the current drop and interrupts the ground return of monitor $M_1$.

In the fluid level monitors described, a fluid level warning is given only when the fluid level falls below a predetermined level. In other words, the monitor remains inactive during normal operation. It is thus possible for a monitor failure, such as a shorted or broken connection, to occur without the knowledge of an observer. A self test feature which will protect against such unobserved failures can be provided as follows, with reference to the probe schematic 60 of FIG. 7. Thermistors 70 and 72 are designed to be identical. However, heaters 64, 66 and 68 are designed to provide the same temperature rise of the various thermistor when heaters 66 and 68 are immersed in fluid and when heater 64 is in air. This should be recognized as the normal, proper fluid level, condition. In addition, the thermal time constant of heaters 66 and 68 with respect to thermistor 70 is designed to be different than the thermal time constant of heater 64 with respect to thermistor 72. With this arrangement, at the moment the probe is energized both thermistors will, of course, be at the same temperature: ambient temperature. As time increases, one thermistor will heat up faster than the other so as to unbalance the bridge and cause the indicator to be energized. If the fluid is below the proper level the indicator will remain energized. However, if the fluid level is proper, eventually both thermistors will attain the same elevated temperature and the indicator will be deenergized. This sequence of indicator deenergized, energized and then again deenergized will be evidence that the monitor is operating properly.

Further modifications and alterations of the invention should now be evident to one skilled in the art. Accordingly, the invention is to be limited to the true scope and spirit of the appended claims.

The invention claimed is:

1. A fluid level monitor constructed in accordance with thick film techniques for monitoring the level of a fluid within a container, comprising:
    a substrate;
    first and second electrical terminals;
    an electrical latch;
    first and second thermistors connected in series across said first and second terminals, said first thermistor being disposed on said substrate and said second thermistor being disposed on said substrate remote from said first thermistor;
    electrical means connected between said first and second terminals including heater means having at least a first portion thereof disposed in relatively close proximity to said first thermistor and adapted to heat said first thermistor, said first and second thermistors being connected with said electrical means into an electrical bridge configuration having interior points, said electrical latch being responsive to the voltage across said interior points to close said latch;
    means for supporting and positioning said substrate within said container with said first thermistor close to the level of the fluid so that at least one of said first thermistors and said first portion of said heater is in thermal contact with the fluid when the level thereof is high whereby the voltage across said interior points is of a first value, and said first thermistor and said first portion of heat heater are out of thermal contact with the fluid when the level thereof is low whereby the voltage across said interior points is of a second value;

a source of a first electrical voltage impressed across said first and second terminals;

a source of a second electrical voltage; and, indicator means responsive to the state of said latch and connected in series with said latch across said source of a second electrical voltage.

2. The monitor of claim 1 wherein said latch is connected across said first and second terminals, said source of a first electrical voltage comprising said indicator means connected in series with said source of a second electrical voltage.

3. The monitor of claim 1 wherein said electrical means comprises impedance means connected across said first and second terminals, one of said interior points being within said impedance means; and means responsive to the voltage across said points for controlling current flow in said heater, said latch being responsive to current flow in said heater to close said latch.

4. The monitor of claim 3 wherein said latch is connected across said first and second terminals, said source of a first electrical voltage comprising said indicator means connected in series with said source of a second electrical voltage.

5. The monitor of claim 4 wherein said second terminal comprises the return terminal of said source of a first electrical voltage, said means for supporting and positioning comprising said second terminal.

6. The monitor of claim 1 wherein said heater means includes a second portion serially connected with said first portion between said first and second terminals, said second portion being disposed in relatively close proximity to said second thermistor and adapted to heat said second thermistor.

7. The monitor of claim 6 wherein said latch is connected across said first and second terminals, said source of a first electrical voltage comprising said indicator means connected in series with said source of a second electrical voltage.

8. The monitor of claim 7 wherein said second terminal comprises the return terminal of said source of a first electrical voltage, said means for supporting and positioning comprising said second terminal.

9. The monitor of claim 1 wherein said electrical means comprises first and second means having positive resistance temperature coefficients connected in series across said first and second terminals, one of said interior points being at the junction of said first and second means, and a third means having a negative resistance temperature coefficient connected in shunt across one of said first and second means.

10. A fluid level monitor probe comprising:

a thin, flat, plate like electrically non-conductive substrate having a supporting surface, said substrate being relatively long and narrow;

at least a first heater affixed to said supporting surface at one end of said substrate;

a first thermistor affixed to said supporting surface in close proximity to said first heater;

a second thermistor affixed to said supporting surface at an opposite end of said substrate, said substrate being adapted for cooperation with a fluid whose level is to be monitored so that at least a portion of said one end is immersed in said fluid and said opposite end is out of said fluid; and, electrically conductive tracks affixed to said supporting surface and adapted to provide electrical communication between said first and second thermistors and said heater.

11. The probe of claim 10 with a second heater affixed to said supporting surface at said opposite end and in close proximity to said second thermistor, said electrically conductive tracks providing electrical communication with said second heater.

12. The probe of claim 11 wherein said first and second heaters and said first and second thermistors are arranged with said electrically conductive tracks to form a bridge circuit.

13. The probe of claim 12 with means for sensing the voltage across interior points of said bridge circuit and also including means for impressing voltage across said bridge circuit.

14. The probe of claim 10 with further resistance means affixed to said supporting surface and cooperating with said first and second thermistors and said electrically conductive tracks to form a bridge circuit, the voltage across interior points of said bridge circuit comprising a first signal; and, means for controlling said first heater in response to said first signal.

15. A fluid level monitor constructed in accordance with thick film techniques for monitoring the level of a fluid within a container, comprising:

a substrate;

first and second electrical terminals;

electrical means connected between said first and second electrical terminals including first and second thermistors, said first thermistor being disposed on said substrate and said second thermistor being disposed on said substrate remote from said first thermistor and heater means having at least a first portion thereof disposed in relatively close proximity to said first thermistor and adapted to heat said first thermistor, and wherein said substrate is adapted to be supported and positioned within said container with said first thermistor close to the level of the fluid so that at least one of said first thermistors and said first portion of said heater is in thermal contact with the fluid when the level thereof is high whereby the ratio of the resistance of said first thermistor with respect to the resistance of said second thermistor is a first value, and whereby the ratio of the resistance of said first thermistor with respect to the resistance of said second thermistor is a second value when said first thermistor and said first portion of said heater are out of thermal contact with the fluid.

* * * * *